United States Patent Office 3,129,204
Patented Apr. 14, 1964

3,129,204
VULCANIZATION OF NATURAL AND SYNTHETIC RUBBERS WITH BIS(TERT - ALKYLPEROXY)-ALKANE
Ernest R. Gilmont, Princeton, N.J., assignor to FMC Corporation, a corporation of Delaware
No Drawing. Filed Aug. 5, 1959, Ser. No. 831,702
18 Claims. (Cl. 260—83.3)

This invention relates to improved rubber compositions, and particularly to the vulcanization of rubbers employing new vulcanizing agents.

Heretofore, the vulcanization of rubber has been carried out principally with sulfur-containing compounds. The use of these compounds in vulcanizing rubber products has been studied extensively, with the result that a large number of sulfur-containing vulcanizing agents have been developed. A certain amount of work on chemicals related to the sulfur compounds has been carried out also. For example, various selenium and tellurium compounds have been studied, and vulcanizing agents based on these elements have been adopted to a limited extent.

However, despite the large amount of work done on these conventional rubber-vulcanizing agents, it has not been found possible to eliminate certain deleterious properties from rubber products vulcanized with them. Thus, white and light colored rubber products vulcanized with sulfur compounds have the disadvantage of yellowing and undergoing surface-crazing on exposure to sunlight and heat.

Strangely, although oxygen is known to deteriorate rubber, certain organic peroxides have been found to vulcanize rubber. The early peroxides found no commercial application in this field, however, since a large amount of peroxide was necessary to provide a good cure, and this use of a large amount of peroxide led to surface-blooming of the product, as well as to poor initial and aging properties.

More recently, it has been found that a few selected organic peroxides have practical utility as rubber vulcanizing agents. For example, peroxides have been found which will vulcanize rubber satisfactorily, and at the same time produce products having satisfactory resistances to surface discoloration and crazing. However, peroxides frequently give rise to objectionable odors in rubber products, and also cause them to impart objectionable tastes to water and other liquids which are contacted with them. This is an obvious disadvantage in tubing, containers and the like. No peroxide has been known heretofore which would provide vulcanized rubber products free of objectionable odor and taste properties, and at the same time possessed of high quality physical properties and resistances to crazing and discoloring on exposure to heat and light.

It is a feature of this invention to provide rubber compositions containing a new class of organic peroxides, and a method of vulcanizing rubbers with these peroxides. It is a further feature to provide vulcanized rubber products which possess good general physical properties, including excellent resistances to discoloration and surface crazing on exposure to ultra-violet light and heat, and which at the same time do not have objectionable odors or impart strong, objectionable tastes to water.

In accordance with the present invention, a vulcanized rubber product is provided by vulcanizing a compound containing a rubber and about 0.1 to 10%, and preferably 0.25 to 7%, on the weight of the rubber of a bis(tert-alkylperoxy)alkane of the following formula:

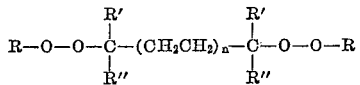

where $n$ is 1 or 2, R is a tertiary alkyl radical, R' and R" are either individual hydrocarbon radicals, or are alkylene radicals connected to form a cycloalkylene radical. The hydrocarbon radicals, R' and R", suitably are alkyl, cycloalkyl, aralkyl, or aryl hydrocarbon radicals. Preferred peroxides are those in which R is a tertiary alkyl radical having from 4 to 8 carbon atoms, and in which R' and R" are primary alkyl radicals, particularly such radicals having from 1 to 8 carbon atoms.

The vulcanized products of this invention exhibit excellent physical properties, including the desirable property of resisting discoloration and surface-crazing on aging in ultra-violet light and heat. At the same time, these vulcanized products have essentially no objectionable odors, and upon extended contact with water they do not impart strong, objectionable tastes to it. This combination of properties provided in rubbers prepared with the present peroxides renders these peroxides useful in applications for which the organic peroxides as a class were previously considered unsuitable.

Typical peroxides useful in forming the present rubber-peroxide compositions are:

2,5-bis(tert-amylperoxy)-2,5-dimethylhexane,
2,5-bis(tert-butylperoxy)-2,5-dimethylhexane,
1,1'-ethylenebis[1-(tert-amylperoxy)cyclohexane],
2,5-bis(tertbutylperoxy)-2,5-diphenylhexane,
3,6-bis(tert-butylperoxy)-3,6-dimethyloctane,
2,7-bis(tert-butylperoxy)-2,7-dimethyloctane,
2,5-bis(tert-butylperoxy)-2,5-dicyclohexylhexane,
2,5-bis(tert-butylperoxy)-2,5-dibenzylhexane,
8,11-bis(tert-butylperoxy)-8,11-dimethyloctadecane, and
2,5-bis(2,5-dimethyl-2-hexylperoxy)-2,5-dimethylhexane.

There peroxides, and methods for their preparation, are described in co-pending patent application Serial No. 786,711, filed January 14, 1959, in the name of the present inventor.

The rubbers which may be vulcanized with the present peroxides are natural rubber and the various synthetic rubbers prepared by polymerization of the conjugated dienes and of chloroprene. The conjugated diene polymers include homopolymers of such conjugated dienes as butadiene, isoprene, and substituted derivatives of these compounds, and copolymers of these conjugated dienes, alone or together, with materials containing a vinyl group. Typical useful compounds containing the vinyl group are acrylonitrile, styrene, and the like. Exemplary useful rubbers include natural rubber, polybutadienestyrene, polybutadieneacrylonitrile, polychloroprene, polybutadiene and polyisoprene.

Suitable antioxidants, fillers, extenders, plasticizing agents, softeners, accelerators of vulcanization, and the like, may be employed in the present rubber-peroxide compositions. Fillers and reinforcing agents such as carbon black, barium oxide, zinc oxide, titanium dioxide, and the like are particularly useful in the present compositions, and impart improved physical properties to compounds containing them.

The quantity of peroxide employed in the present rubber compositions will vary from about 0.1 to 10%, and preferably from about 0.25 to 7%, depending on the conditions to be employed in vulcanization, and on the properties desired in the vulcanized product. Preparation of rubber compositions containing the peroxides may be carried out readily in conventional equipment, for example on a two-roll rubber mill, in a blade mixer, and the like. Likewise, the peroxides may be compounded with rubber latexes.

The rubber-peroxide compositions may be vulcanized normally at temperatures ranging from about 275° to 400° F., and preferably at about 320° to 340° F., in from a few minutes to several hours, depending on the particular size and configuration of the product being prepared.

The present compositions are useful in preparing a variety of products, for example rubber tubing and hosing, hospital sheeting, dipped and molded goods, auto and other tires, rubber insulation, and the like. They may be readily compounded, as they are highly resistant to precuring in compounding equipment. Furthermore, they vulcanize rapidly at suitable temperatures and in ordinary equipment, to provide products having excellent physical properties. Very importantly, they have the unusual and highly useful properties of being free of objectionable odors and tastes, and of becoming more white, rather than discoloring, on exposure to ultra-violet light. These properties are of particular utility in auto tires having white side-walls, where the whiteness of the side wall on aging is of paramount importance, and odor is a problem when the tires are stored in tight wrappings. These properties of the vulcanized products are accompanied by a high degree of resistance to surface-crazing on exposure to heat and ultra-violet light, a property which likewise is of particular value.

The following examples are presented by way of illustration of the present invention only, and are not intended to limit the scope of this invention.

EXAMPLES 1, 2 AND 3

Natural rubber compounds were prepared in accordance with the formulas shown in Table I. A masterbatch of 400 g. of select A crepe rubber was blended in a Banbury mixer at 170° to 200° F. for 7 minutes, with 200 g. of zinc oxide, 80 g. of titanium dioxide, 6 g. of stearic acid, and 8 g. of Sunproof. The Sunproof is a wax which serves as an anti-checking and anti-atmospheric-cracking agent for rubber, and is produced by the Naugatuck Chemical Division of the United States Rubber Company.

The vulcanizing agents indicated in Table I for Examples 1, 2 and 3 were then incorporated into 173.5 g. portions (containing 100 g. of the rubber) of the masterbatch on a two-roll rubber mill, over 3 to 5 minutes. The mill roll temperature was about 110° F., and the batch temperature was about 140° to 150° F. The individual batches were cut about 15 times on the mill, and removed from it as sheets which were subsequently vulcanized by heating in press molds at 320° F., for the times indicated in Table II. The vulcanized samples were tested for tensile strength, elongation, modulus, and hardness, by standard ASTM tests, with the results shown in Table II. They were also tested for taste and odor, and for whiteness and surface-crazing, as reported in Table III.

*Table I*

| Component | Compound, Parts by Wt. | | |
|---|---|---|---|
| | Ex. 1 | Ex. 2 | Ex. 3 |
| Masterbatch | 173.5 | 173.5 | 173.5 |
| Sulfur | 2 | | |
| Mercaptobenzothiazole | 0.4 | | |
| Tetramethylthiuram Monosulfide | 0.15 | | |
| Magnesium Oxide | | 10 | 10 |
| 2,5-bis(tert-butylperoxy)-2,5-dimethylhexane | | 1.75 | |
| Dicumyl Peroxide | | | 1.75 |

*Table II*

| Property | Cure Time, Min. at 320° F. | Compound | | |
|---|---|---|---|---|
| | | Ex. 1 | Ex. 2 | Ex. 3 |
| Tensile at Break, p.s.i. | 15 | 2,620 | 2,160 | 2,100 |
| | 30 | 2,220 | 2,100 | 2,140 |
| Modulus at 300% Elongation, p.s.i. | 15 | 400 | 400 | 500 |
| | 30 | 340 | 620 | 600 |
| Elongation at Break, Percent | 15 | 640 | 540 | 480 |
| | 30 | 660 | 430 | 450 |
| Shore A Hardness | 15 | 41 | 44 | 47 |
| | 30 | 39 | 50 | 49 |

*Table III*

| Property | Compound | | |
|---|---|---|---|
| | Ex. 1 | Ex. 2 | Ex. 3 |
| Discoloration [1] | Sl. yellowing | Bleached [2] | Bleached. [2] |
| Surface Crazing [1] | Fine surface cracks. | No crazing | No crazing. |
| Odor [3] | | No objectionable peroxide-derived odor. | Fairly strong odor, traceable to peroxide. |
| Taste [4] | | No objectionable peroxide-derived taste. | Fairly strong taste, traceable to the peroxide. |

[1] After 48 hrs. in Fadeometer.
[2] These samples showed an improvement in whiteness, that is, they were bleached, upon exposure to Fadeometer test conditions.
[3] 1"x2"x⅛" sample sealed in a 4 oz. jar for 48 hrs., cap removed and odor determined.
[4] 1"x2"x⅛" sample immersed in 100 ml. of water at room temperature, for 24 hrs. Taste of water determined at end of immersion period.

EXAMPLE 4

The procedure of Example I was followed in preparing a black natural rubber compound of the following formula.

*Table IV*

| Component: | Parts by wt. |
|---|---|
| Masterbatch— | |
| Select A crepe natural | 100 |
| Furnace black | 50 |
| Zinc oxide | 5 |
| Stearic acid | 2 |
| 2,5-bis(tert-butylperoxy)-2,5-dimethylhexane | 1.75 |

This compound was vulcanized as described in Examples 1, 2 and 3, and tested with the following results:

*Table V*

| Property | Cure Time | Value |
|---|---|---|
| Tensile at Break, p.s.i. | 15 | 3,100. |
| | 30 | 3,300. |
| Modulus at 200% Elongation, p.s.i. | 15 | 920. |
| | 30 | 1,680. |
| Elongation at Break, Percent | 15 | 370. |
| | 30 | 290. |
| Shore A Hardness | 15 | 55. |
| | 30 | 62. |
| Odor | | No objectionable peroxide-traceable odor. |
| Taste | | No objectionable peroxide-traceable taste. |

EXAMPLE 5

The procedure of Example 1 was followed in preparing the following polybutadienestyrene rubber compound.

Table VI

| Masterbatch: | Parts by wt. |
|---|---|
| SBR–1503 [1] | 100 |
| Dixie clay | 75 |
| Stearic acid | 1 |
| Zinc oxide | 5 |
| Reogen [2] | 3 |
| Magnesium oxide | 10 |
| 2,5-bis(tert-butylperoxy)-2,5-dimethylhexane | 1.75 |

[1] Polybutadienestyrene rubber described in ASTM designation D–1419–58T.
[2] A plasticizer for rubber, composed of 80% mineral oil, 15% sulfurated petroleum, and 5% n-butyl alcohol. Produced by the R. T. Vanderbilt Co.

This compound was vulcanized as described in Examples 1, 2 and 3 with the following results:

Table VII

| Property | Cure Time | Value |
|---|---|---|
| Tensile at Break, p.s.i | 15 | 800. |
|  | 30 | 700. |
| Modulus at 100% Elongation, p.s.i | 15 | 340. |
|  | 30 | 520. |
| Elongation at Break, Percent | 15 | 250. |
|  | 30 | 120. |
| Shore A Hardness | 15 | 66. |
|  | 30 | 75. |
| Odor |  | No objectionable peroxide-traceable odor. |
| Taste |  | No objectionable peroxide-traceable taste. |
| Discoloration |  | Bleached. |
| Surface Crazing |  | None. |

EXAMPLE 6

The procedure of Examples 1, 2 and 3 was followed in preparing the following polychloroprene compound.

Table VIII

| Masterbatch: | Parts by wt. |
|---|---|
| Polychloroprene [1] | 100 |
| Semi-reinforcing thermal carbon black | 50 |
| Magnesium oxide | 10 |
| 2,5-bis(tert-butylperoxy)-2,5-dimethylhexane | 1.75 |

[1] Neoprene G—a general-purpose synthetic rubber made by emulsion polymerization of chloroprene. Contains thiuram disulfide as a stabilizer.

This compound was vulcanized as described in Examples 1, 2 and 3, at a temperature 340° F., with the following results:

Table IX

| Property | Cure Time | Value |
|---|---|---|
| Tensile at Break, p.s.i | 10 | 2,020. |
|  | 20 | 1,920. |
| Modulus at 300% Elongation, p.s.i | 10 | 1,520. |
|  | 20 | 1,920. |
| Elongation at Break, Percent | 10 | 430. |
|  | 20 | 300. |
| Shore A Hardness | 10 | 61. |
|  | 20 | 62. |
| Odor |  | No objectionable peroxide-traceable odor. |
| Taste |  | No objectionable peroxide-traceable taste. |

EXAMPLE 7

The procedure of Example 1, 2 and 3 was followed in preparing the following polybutadiene acrylonitrile rubber compound.

Table X

| Component: | Parts by wt. |
|---|---|
| Masterbatch— |  |
| Polybutadieneacrylonitrile rubber [1] | 100 |
| Semi-reinforcing thermal carbon black | 50 |
| Magnesium oxide | 10 |
| 2,5-bis(tert-butylperoxy)-2,5-dimethylhexane | 1.75 |

This compound was vulcanized as described in Examples 1, 2 and 3, at a temperature at 300° F., with the following results:

Table XI

| Property | Cure Time | Value |
|---|---|---|
| Tensile at Break, p.s.i | 40 | 2,160. |
|  | 60 | 2,140. |
| Modulus at 300% Elongation, p.s.i | 40 | 1,100. |
|  | 60 | 1,650. |
| Elongation at Break, Percent | 40 | 480. |
|  | 60 | 350. |
| Shore A Hardness | 40 | 57. |
|  | 60 | 59. |
| Odor |  | No objectionable peroxide-traceable odor. |
| Taste |  | No objectionable peroxide-traceable taste. |

EXAMPLE 8

Natural rubber samples vulcanized by the procedure described in Examples 1, 2 and 3, with the peroxide listed below, have physical properties on the same order as those shown for the product of Example 2. Likewise, they provide white rubber products which bleach, that is gain in whiteness, on exposure to ultra-violet light, and which are free of objectionable odors and tastes. The additional peroxides referred to are:

2,5-bis(tert-amylperoxy)-2,5-dimethylhexane,
1,1′-ethylenebis[1-(tert-amylperoxy)cyclohexane],
2,5-bis(tert-butylperoxy)-2,5-diphenylhexane,
3,6-bis(tert-butylperoxy)-3,6-dimethyloctane.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. Rubber composition useful in the production of a vulcanized rubber product, comprising a rubber from the group consisting of natural rubber, the conjugated diene homopolymer synthetic rubbers and the synthetic rubbers which are copolymers of the conjugated dienes with monomers containing a vinyl group, and on the weight of the rubber, about 0.1 to 10% of a bis(tert-alkylperoxy)alkane of the following formula

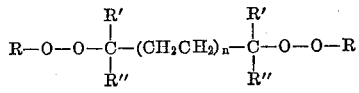

where $n$ is 1 or 2, R is a tertiary alkyl radical, and R′ and R″ are hydrocarbon radicals from the group consisting of individual unconnected hydrocarbon radicals and cycloalkylene radicals in which R′ and R″ are alkylene radicals connected to form said cycloalkylene radicals.

2. Composition of claim 1 in which about 0.25 to 7% of the bis(tert-alkylperoxy)alkane is used.

3. Compoistion of claim 1 in which the bis(tert-alkylperoxy)alkane has the following formula

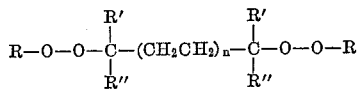

where $n$ is 1 or 2, R is a tertiary alkyl radical and R' and R" are primary alkyl radicals.

4. Composition of claim 1 wherein the bis(tert-alkyl-peroxy)alkane has the following formula

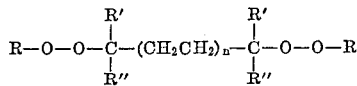

where $n$ is 1 or 2, R is a tertiary alkyl radical having 4 to 8 carbon atoms, and R' and R" are primary alkyl radicals having 1 to 8 carbon atoms.

5. Rubber composition useful in the production of a vulcanized rubber product, comprising a rubber from the group consisting of natural rubber, the conjugated diene homopolymer synthetic rubbers and the synthetic rubbers which are copolymers of the conjugated dienes with monomers containing a vinyl group, and on the weight of the rubber about 0.1 to 10% of 2,5-bis(tert-amylperoxy)-2,5-dimethylhexane.

6. Rubber composition useful in the production of a vulcanized rubber product, comprising a rubber from the group consisting of natural rubber, the conjugated diene homopolymer synthetic rubbers and the synthetic rubbers which are copolymers of the conjugated dienes with monomers containing a vinyl group, and on the weight of the rubber about 0.1 to 10% of 2,5-bis(tert-butylperoxy)-2,5-dimethylhexane.

7. Rubber composition useful in the production of a vulcanized rubber product, comprising a rubber from the group consisting of natural rubber, the conjugated diene homopolymer synthetic rubbers and the synthetic rubbers which are copolymers of the conjugated dienes with monomers containing a vinyl group, and on the weight of the rubber about 0.1 to 10% of 1,1'-ethylenebis[1-(tert-amylperoxy)cyclohexane].

8. Rubber composition useful in the production of a vulcanized rubber product, comprising a rubber from the group consisting of natural rubber, the conjugated diene homopolymer synthetic rubbers an dthe synthetic rubbers which are copolymers of the conjugated dienes with monomers containing a vinyl group, and on the weight of the rubber about 0.1 to 10% of 2,5-bis(tert-butylperoxy)-2,5-diphenylhexane.

9. Rubber composition useful in the production of a vulcanized rubber product, comprising a rubber from the group consisting of natural rubber, the conjugated diene homopolymer synthetic rubbers and the synthetic rubbers which are copolymers of the conjugated dienes with monomers containing a vinyl group, and on the weight of the rubber about 0.1 to 10% of 3,6-bis(tert-butylperoxy)-3,6-dimethyloctane.

10. Method of vulcanizing a rubber, comprising mixing together a rubber, from the group consisting of natural rubber, the conjugated diene homopolymer synthetic rubbers and the synthetic rubbers which are copolymers of the conjugated dienes with monomers containing a vinyl group, and on the weight of the rubber about 0.1 to 10% of a bis(tert-alkylperoxy)alkane having the following formula

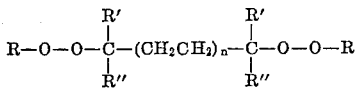

where $n$ is 1 or 2, R is a tertiary alkyl radical and R' and R" are hydrocarbon radicals from the group consisting of individual unconnected hydrocarbon radicals and cycloalkylene radicals in which R' and R" are alkylene radicals connected to form said cycloalkylene radicals, and thereafter vulcanizing the resulting mixture.

11. Method of claim 10 wherein about 0.25 to 7% of the bis(tert-alkylperoxy)alkane is used.

12. Method of claim 10 wherein the bis(tert-alkylperoxy)alkane has the following formula

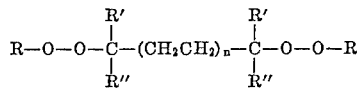

where $n$ is 1 or 2, R is a tertiary alkyl radical, and R' and R" are primary alkyl radicals.

13. Method of claim 10 wherein the bis(tert-alkylperoxy)alkane has the following formula

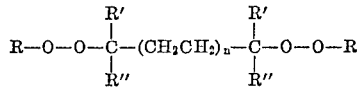

where $n$ is 1 or 2, R is a tertiary alkyl radical having 4 to 8 carbons, and R' and R" are primary alkyl radicals having 1 to 8 carbon atoms.

14. Method of vulcanizing rubber, comprising mixing together a rubber from the group consisting of natural rubber, the conjugated diene homopolymer synthetic rubbers and the synthetic rubbers which are copolymers of the conjugated dienes with monomers containing a vinyl group, and on the weight of said rubber about 0.1 to 10% of 2,5-bis(tert-amylperoxy) - 2,5 - dimethylhexane, and thereafter vulcanizing the resulting mixture.

15. Method of crosslinking a rubber, comprising mixing together a rubber from the group consisting of natural rubber, the conjugated diene homopolymer synthetic rubbers and the synthetic rubbers which are copolymers of the conjugated dienes with monomers containing a vinyl group, and on the weight of the rubber about 0.1 to 10% of 2,5-bis(tert-butylperoxy) - 2,5 - dimethylhexane, and thereafter vulcanizing the resulting mixture.

16. Method of vulcanizing a rubber, comprising mixing together a rubber from the group consisting of natural rubber, the conjugated diene homopolymer synthetic rubbers and the synthetic rubbers which are copolymers of the conjugated dienes with monomers containing a vinyl group, and on the weight of the rubber about 0.1 to 10% of 1,1'-ethylenebis[1-(tert-amylperoxy)cyclohexane], and thereafter vulcanizing the resulting mixture.

17. Method of vulcanizing a rubber, comprising mixing together a rubber from the group consisting of natural rubber, the conjugated diene homopolymer synthetic rubbers and the synthetic rubbers which are copolymers of the conjugated dienes with monomers containing a vinyl group, and on the weight of the rubber about 0.1 to 10% of 2,5-bis(tert-butylperoxy) - 2,5 - diphenylhexane, and thereafter vulcanizing the resulting mixture.

18. Method of vulcanizing a rubber, comprising mixing together a rubber from the group consisting of natural rubber, the conjugated diene homopolymer synthetic rubbers and the synthetic rubbers which are copolymers of the conjugated dienes with monomers containing a vinyl group, and on the weight of the rubber about 0.1 to 10% of 3,6-bis(tert-butylperoxy) - 3,6 - dimethyloctane, and thereafter vulcanizing the resulting mixture.

References Cited in the file of this patent

UNITED STATES PATENTS

| 2,455,569 | Dickey | Dec. 7, 1948 |
| 2,813,127 | White | Nov. 12, 1957 |

FOREIGN PATENTS

| 1,144,641 | France | Oct. 16, 1957 |

OTHER REFERENCES

Fisher: "Chemistry of Natural and Synthetic Rubbers," page 29, Reinhold Publishing Corporation, New York, 1957.

Whitby, G.S.: "Synthetic Rubber," John Wiley & Sons, Inc., New York, 1954, pages 913–114.